Sept. 29, 1931.  H. D. GEYER  1,825,391
STEERING WHEEL
Filed April 3, 1928

Inventor
Harry D. Geyer
By Spencer Hardman & Fehr
his Attorney

Patented Sept. 29, 1931

1,825,391

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed April 3, 1928. Serial No. 266,937.

This invention relates to improvements in handwheels, especially such as are used as steering wheels on automotive vehicles.

An object of the invention is to provide an efficient handwheel of good appearance and economical to manufacture and having both rim and spider portions of metal reinforced molded material, such as hard rubber.

A more specific object is to provide such a wheel having an integral metal spider casting comprising both the hub and radiating spokes, the hub having a sleeve adapted to be fixed to the shaft and also an outwardly flared open top cup portion adapted to form a recess or housing for the usual controls which are mounted upon the steering wheel of an automobile, for instance, the spark advance and throttle controls.

Another object is to provide such a wheel having the metal spider spokes of cruciform cross section whereby a maximum bending strength of the spokes is obtained in the two planes in which the spoke received bending stress, that is, in a vertical plane caused by a heavy driver pulling himself up from his seat by grasping the steering wheel rim, and in the plane of the rim caused by the steering torque. By such cruciform section with the webs thereof extending in the two planes of bending stress, the outlines of the rubber covered spokes may cover a minimum area in plan view for the desired strength of spokes, and hence a better appearing and lighter weight steering wheel may be provided than heretofore considered practicable.

Further objects and advantages of the present invention will be apparent from the following description, reference being had to the accompanying drawings, wherein a preferred form of embodiment of the present invention is clearly shown.

Figure 4:
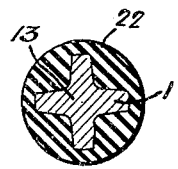
Fig. 4 is a vertical section on line 4—4 of Fig. 1.

Similar reference characters refer to similar parts thruout. The one-piece metal spider casting, indicated in its entirety by numeral 10, is preferably of malleable iron and comprises a sleeve portion 11 which is adapted to telescope upon a steering shaft and be fixed thereto by any ordinary means such as by a spline or key. Integral with this sleeve 11 and flaring upwardly and outwardly therefrom is a relatively large central cup portion 12 forming an open top central recess of such size and shape as to conveniently house and contain the control levers and mechanism for the spark advance and engine throttle, or any other desired control mechanism. Such enlarged central cup portions have heretofore been provided for this purpose, but in all prior wheels of this kind the central hub member containing the central cup has been a separate member or members which have been fixed within a central opening in the steering wheel as by bolts or screws. This invention eliminates all such separate hub parts and provides a single integral casting for the entire metal hub and spider. The spider metal spokes 13 radiate from the outer periphery 14 of the cup portion 12, as clearly shown. These spokes 13 are of cruciform section (see Fig. 4) and gradually taper from the periphery 14 to the spoke ends 15, where they have a small axial boss 16 which is drilled out for the reception of the screws 17. An annular rim reinforcing steel ring or hoop 20, preferably of flat section as clearly shown, is fixed to the flat outer ends 15 of the spider spokes 13 by the drive screws 17 which have hardened threads so that when they are driven into the drilled holes in bosses 16 they will cut their own threads in the metal thereof and hence rigidly fix the hoop 20 to each spoke end.

Figure 1:
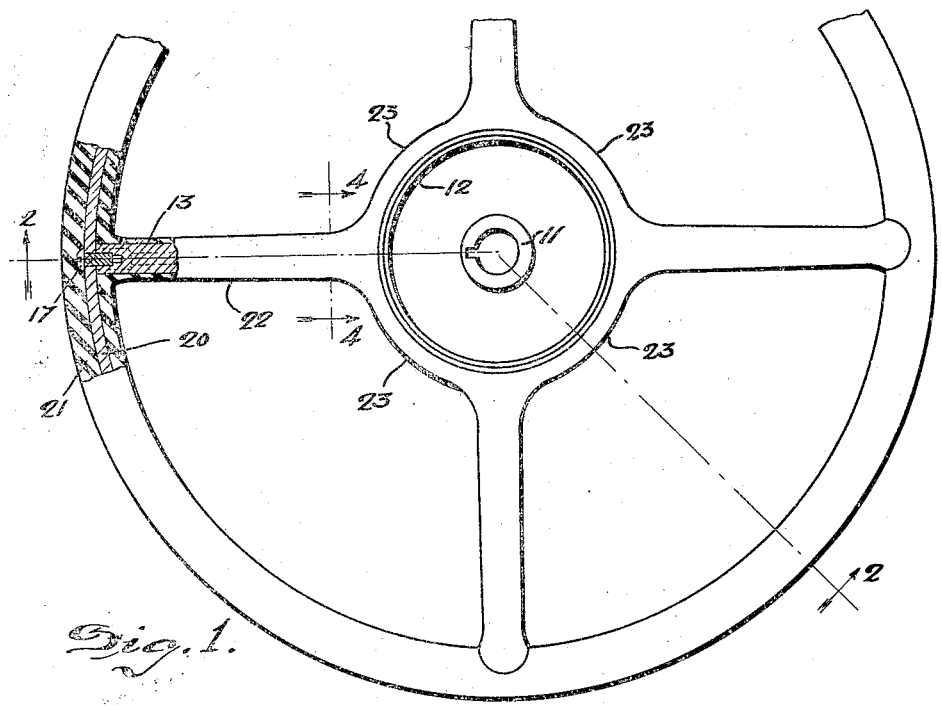
Fig. 1 is a plan view, partly in section, of a steering wheel built according to this invention.
Figure 2:
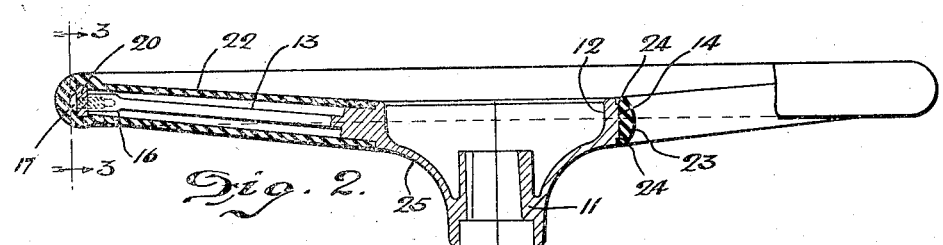
Fig. 2 is a vertical section taken on line 2—2 of Fig. 1.
Figure 3:
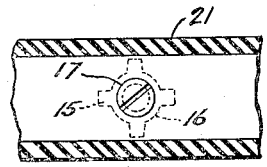
Fig. 3 is a vertical section taken on line 3—3 of Fig. 2, but with a portion of the molded rubber removed.

This metal skeleton comprising the metal spider 10 and the rim hoop 20 having been so formed, now has a plastic unvulcanized rubber compound laid thereupon in any suitable manner to completely cover and form a body 21 for the rim and a body 22 for the spokes. Also this rubber compound is laid around the outer periphery 14 of the cup portion 12 to form a body 23 encasing said periphery 14 to a depth equal or substantially equal to the depth of the spoke body 22. This periphery 14 has shoulders 24 thereon (see Fig. 2) which interlock with and support the rubber material. The wheel with the plastic rubber material thereon is now set within a suitable vulcanizing mold and the rubber vulcanized in place to the desired degree of hardness and of course at the same time forming a firm bond with the metal parts covered thereby. The rim body 21 encases the heads of the drive screws 17 and prevents any possibility of their loosening or coming out. The cruciform section of the spokes 13 absolutely and positively locks the rubber spoke body 22 in place and limits any probability of the rubber cracking or breaking off of the metal spokes 13. The shoulders 24 do the same thing for the rubber body 23 surrounding the periphery 14 of the cup portion 12. It will be noted from viewing Figs. 1 and 2 that the vulcanizing mold cavity for the rubber is greatly simplified in shape by the provision of the rubber bodies 23 of equal depth with the molded spokes 22, and that no coring of any kind is required. The lower flaring portion 25 of central cup portion 12 is unencased with rubber material and the finished wheel therefore, gives the appearance of a separate hub member fixed to the molded rubber wheel. So far as outer appearances go, the wheel of this invention appears similar to that disclosed in my copending application Serial No. 216,116, filed August 29, 1927, however, this present invention provides various economies of manufacture not present in said prior application, as pointed out in the first part of this specification.

While the form of embodiment of the present invention as herein disclosed, constitutes a preferred form, it is to be understood that other forms might be adopted, all coming within the scope of the claims which follow.

What is claimed is as follows:

1. A steering wheel comprising an integral spider casting having a central open top cup portion and a sleeve portion depending therefrom and adapted to be fixed to a shaft and a plurality of spokes radiating from the periphery of said cup portion, a metal reinforcing hoop fixed to the ends of said spokes, and molded rubber encasing said hoop, metal spokes and the upper peripheral portion of said cup portion, but leaving said depending sleeve portion unencased by said rubber, whereby to give the appearance of a separate hub portion fixed to a molded rubber wheel.

2. A steering wheel comprising a spider casting having a sleeve portion adapted to be fixed to a central shaft, an upwardly and outwardly flaring cup portion integral with said sleeve portion, and a plurality of spokes of cruciform section radiating from the periphery of said cup portion, a reinforcing ring fixed to the ends of said spokes, and an integral rubber covering vulcanized in place and encasing said ring and said spokes, said rubber covering also encasing the periphery of said cup portion for a depth approximating the depth of the rubber encased spokes.

3. A steering wheel comprising, a cast metal spider having a central open top cup portion and a sleeve portion depending therefrom and adapted to be fixed to a shaft, a plurality of metal spokes radiating from the periphery of said cup portion, a reinforcing ring fixed to the ends of said spokes, and a molded non-metallic covering encasing said ring, metal spokes and the upper peripheral portion of said cup portion, but leaving said depending sleeve portion unencased by said molded material whereby to give the appearance of a separate hub portion fixed to a molded wheel.

In testimony whereof I hereto affix my signature.

HARVEY D. GEYER.